(12) United States Patent
Steinebach et al.

(10) Patent No.: US 10,293,771 B2
(45) Date of Patent: May 21, 2019

(54) CAST BUMPER ASSEMBLY AND METHOD OF MANUFACTURING SAME

(71) Applicants: Edward K. Steinebach, Oak Ridge, TN (US); Mark Justin Jones, Knoxville, TN (US); Jeffrey Jay Mellis, Bloomfield Hills, MI (US); Jeremiah John Brady, Knoxville, MI (US); Richard Lee Winfree, Knoxville, TN (US); Warren Edward Young, Troy, MI (US); Erryn Leigh Ashmore, Berkley, MI (US); Darren Andrew Womack, Windsor (CA); Venugopal Garimella, Commerce Township, MI (US); Paul James Marston, Maryville, TN (US)

(72) Inventors: Edward K. Steinebach, Oak Ridge, TN (US); Mark Justin Jones, Knoxville, TN (US); Jeffrey Jay Mellis, Bloomfield Hills, MI (US); Jeremiah John Brady, Knoxville, MI (US); Richard Lee Winfree, Knoxville, TN (US); Warren Edward Young, Troy, MI (US); Erryn Leigh Ashmore, Berkley, MI (US); Darren Andrew Womack, Windsor (CA); Venugopal Garimella, Commerce Township, MI (US); Paul James Marston, Maryville, TN (US)

(73) Assignee: MAGNA INTERNATIONAL INC., Aurora (CA)

(*) Notice: Subject to any disclaimer, the term of this patent is extended or adjusted under 35 U.S.C. 154(b) by 72 days.

(21) Appl. No.: 15/319,878

(22) PCT Filed: Jul. 8, 2015

(86) PCT No.: PCT/US2015/039596
§ 371 (c)(1),
(2) Date: Dec. 19, 2016

(87) PCT Pub. No.: WO2016/007661
PCT Pub. Date: Jan. 14, 2016

(65) Prior Publication Data
US 2017/0136970 A1   May 18, 2017

Related U.S. Application Data

(60) Provisional application No. 62/022,366, filed on Jul. 9, 2014.

(51) Int. Cl.
*B60R 19/34* (2006.01)
*B60R 19/03* (2006.01)
(Continued)

(52) U.S. Cl.
CPC .............. *B60R 19/34* (2013.01); *B60R 19/03* (2013.01); *B60R 19/18* (2013.01);
(Continued)

(58) Field of Classification Search
CPC ....... B60R 19/02; B60R 19/023; B60R 19/03; B60R 19/18; B60R 19/26; B60R 19/34
(Continued)

(56) References Cited

U.S. PATENT DOCUMENTS 5,785,367 A * 7/1998 Baumann ................ B60R 19/18
293/133
6,318,775 B1 * 11/2001 Heatherington ........ B60R 19/18
293/120
(Continued)

FOREIGN PATENT DOCUMENTS

EP   1640147 A1   3/2006
EP   2284045 A1   2/2011
(Continued)

*Primary Examiner* — Jason S Daniels
(74) *Attorney, Agent, or Firm* — Dickinson Wright PLLC

(57) ABSTRACT

A vehicle bumper assembly includes a bumper beam and a crash box. At least one of the bumper beam or the crash box is cast from metal, such as aluminum or magnesium, to
(Continued)

reduce weight, reduce manufacturing process steps, and improve performance characteristics of the bumper assembly. In an embodiment, both of the bumper beam and the crash box are cast from metal to establish an integral connection therebetween. One of the bumper beam or the crash box can be open along a top and bottom portion of the bumper assembly and include at least one reinforcing rib cast integral therewith. In an embodiment, both of the bumper beam and the crash box can be open along a top and bottom portion of the bumper assembly and each include at least one reinforcing rib cast integral therewith.

7 Claims, 8 Drawing Sheets

(51) Int. Cl.
    *B60R 19/18*     (2006.01)
    *B60R 19/24*     (2006.01)

(52) U.S. Cl.
    CPC . *B60R 2019/182* (2013.01); *B60R 2019/1813* (2013.01); *B60R 2019/247* (2013.01)

(58) Field of Classification Search
    USPC .................................................. 293/132, 133
    See application file for complete search history.

(56) References Cited

U.S. PATENT DOCUMENTS

| | | | |
|---|---|---|---|
| 6,338,510 B1 * | 1/2002 | Kanamori | B60R 19/26 293/154 |
| 6,969,548 B1 | 11/2005 | Goldfine | |
| 7,044,515 B2 * | 5/2006 | Mooijman | B60R 19/18 293/102 |
| 7,390,038 B2 | 6/2008 | Campbell et al. | |
| 7,837,230 B2 | 11/2010 | Mellis et al. | |
| 7,959,197 B2 | 6/2011 | Agrahari et al. | |
| 9,156,417 B2 * | 10/2015 | Mori | B60R 19/34 |
| 10,059,290 B2 * | 8/2018 | Nakajima | B60R 19/18 |
| 2003/0057692 A1 | 3/2003 | Horsch et al. | |
| 2005/0104392 A1 * | 5/2005 | Liebhard | B60R 19/18 293/132 |
| 2007/0056819 A1 | 3/2007 | Kano et al. | |
| 2007/0114804 A1 | 5/2007 | Gross et al. | |
| 2007/0271793 A1 | 11/2007 | Mellis et al. | |
| 2008/0012386 A1 | 1/2008 | Kano et al. | |
| 2008/0308196 A1 | 12/2008 | Chung | |
| 2009/0026799 A1 | 1/2009 | Garilov | |
| 2010/0126813 A1 | 5/2010 | Hayashi | |
| 2011/0187135 A1 | 8/2011 | Kano et al. | |
| 2012/0025547 A1 | 2/2012 | Haneda et al. | |
| 2012/0205927 A1 | 8/2012 | Asakawa et al. | |
| 2013/0157073 A1 | 6/2013 | Charest et al. | |
| 2013/0234456 A1 | 9/2013 | Brockhoff et al. | |
| 2017/0182960 A1 * | 6/2017 | Nakajima | B60R 19/34 |

FOREIGN PATENT DOCUMENTS

| | | |
|---|---|---|
| JP | 2008296716 A | 12/2008 |
| JP | 2010120026 A | 6/2010 |
| JP | 2011179579 A | 9/2011 |
| WO | 2016007661 A1 | 1/2016 |

* cited by examiner

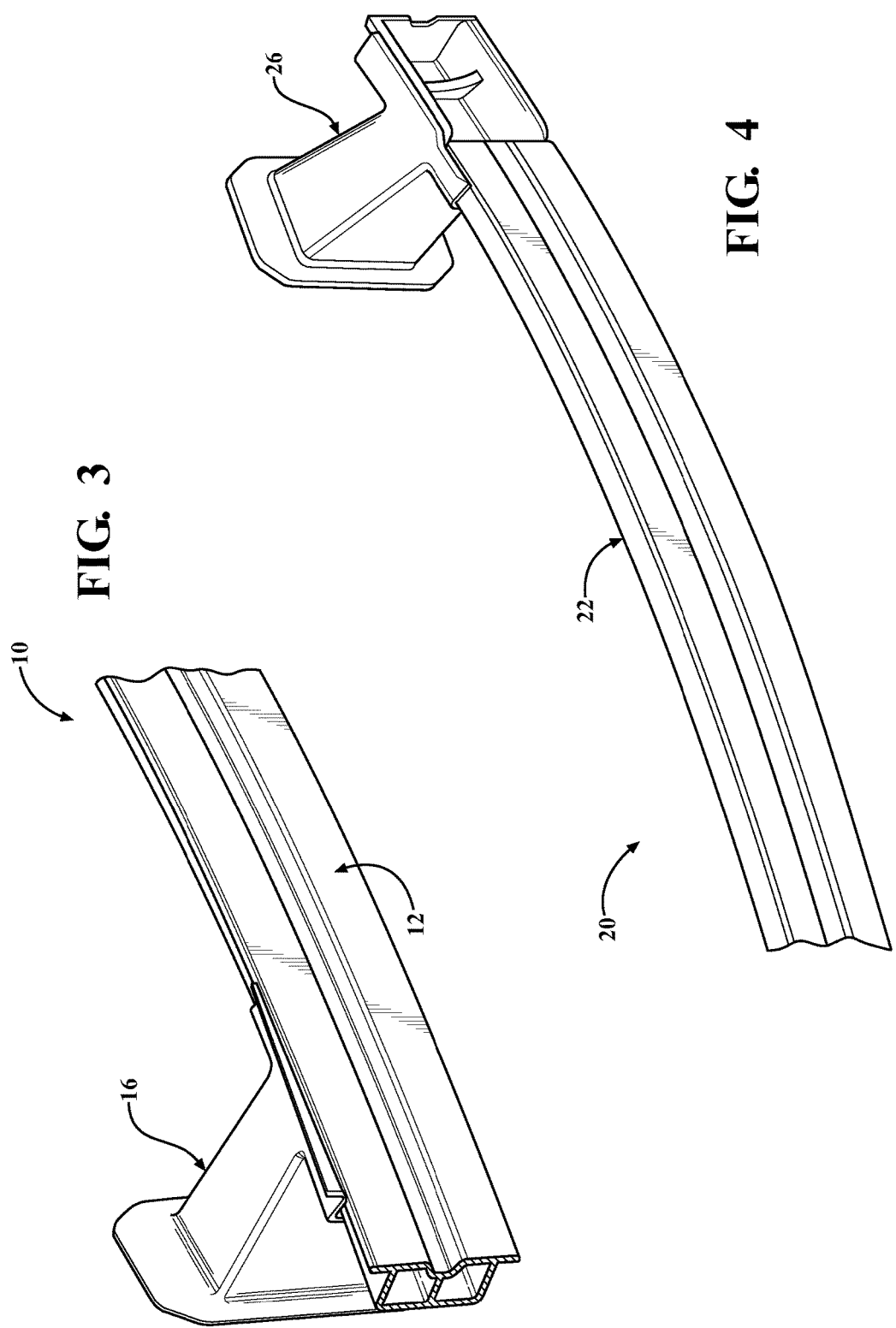

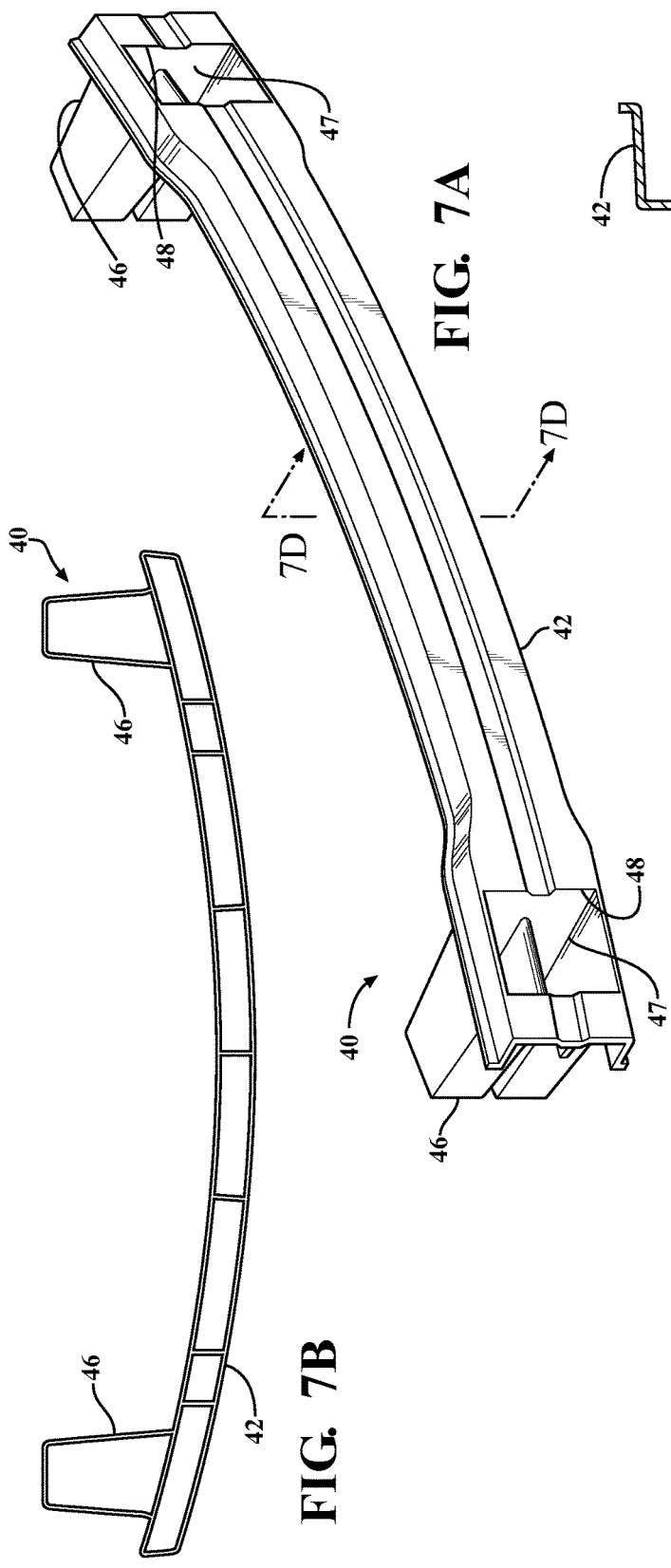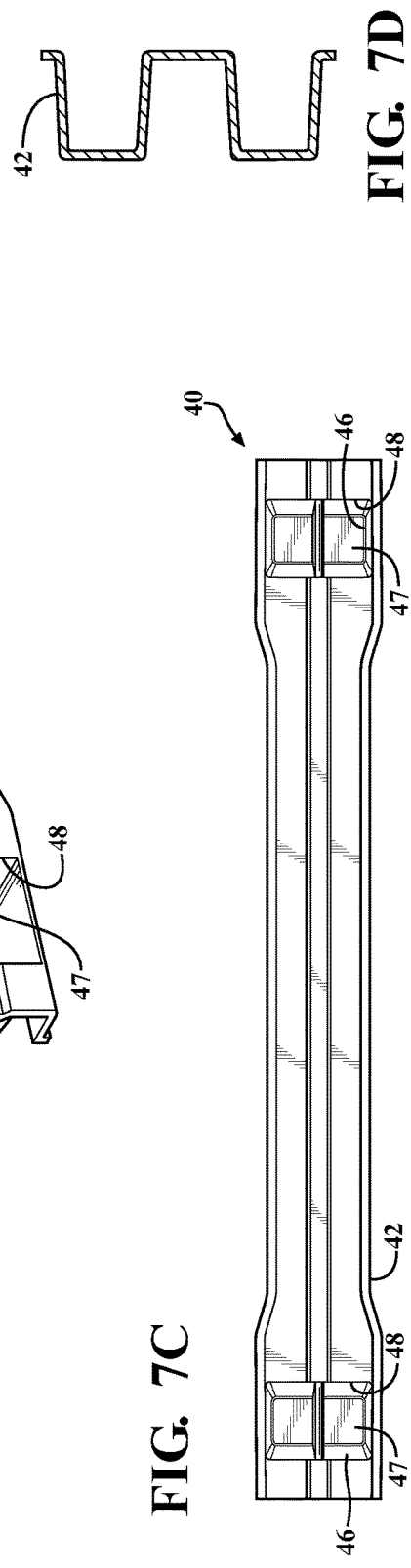

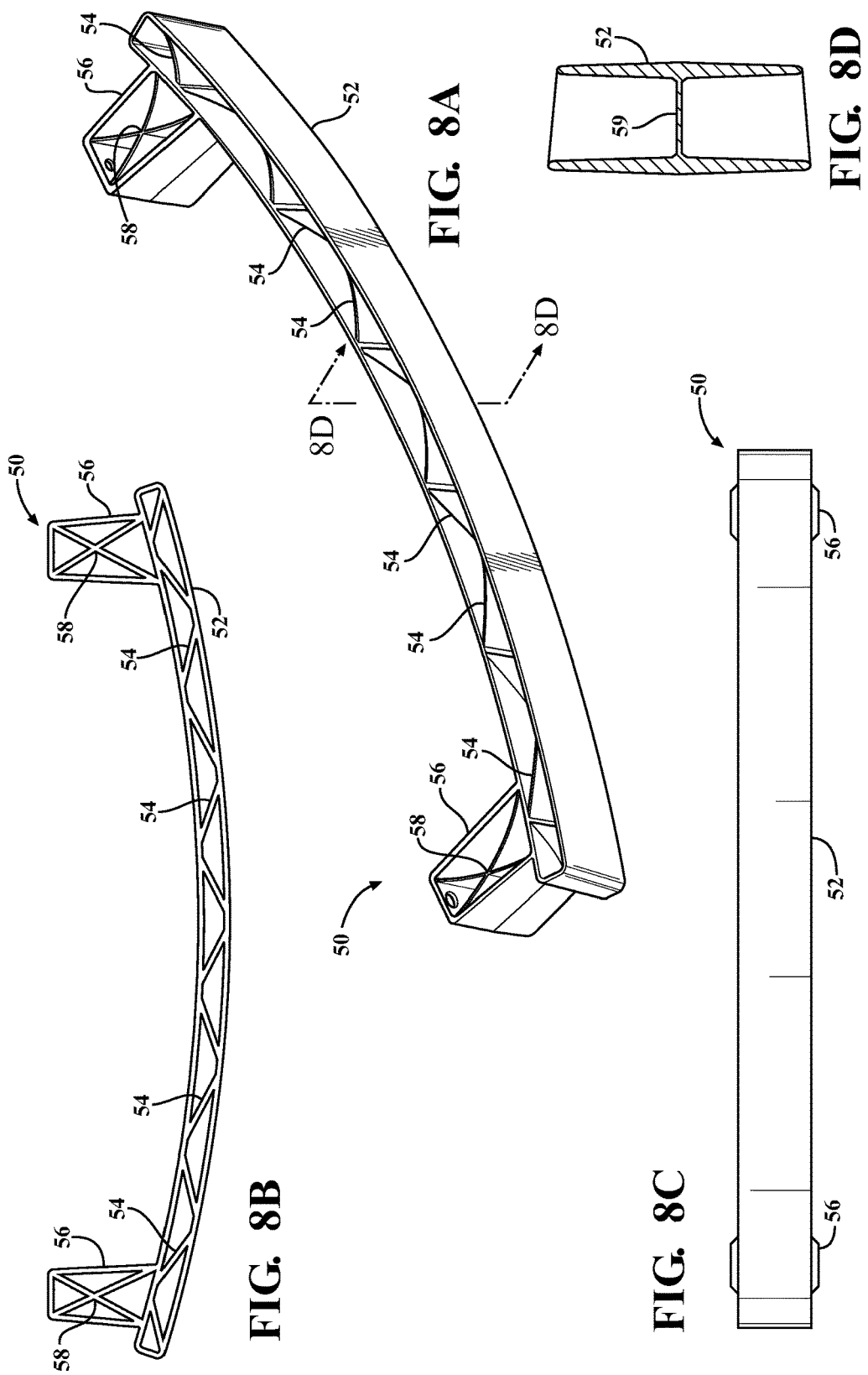

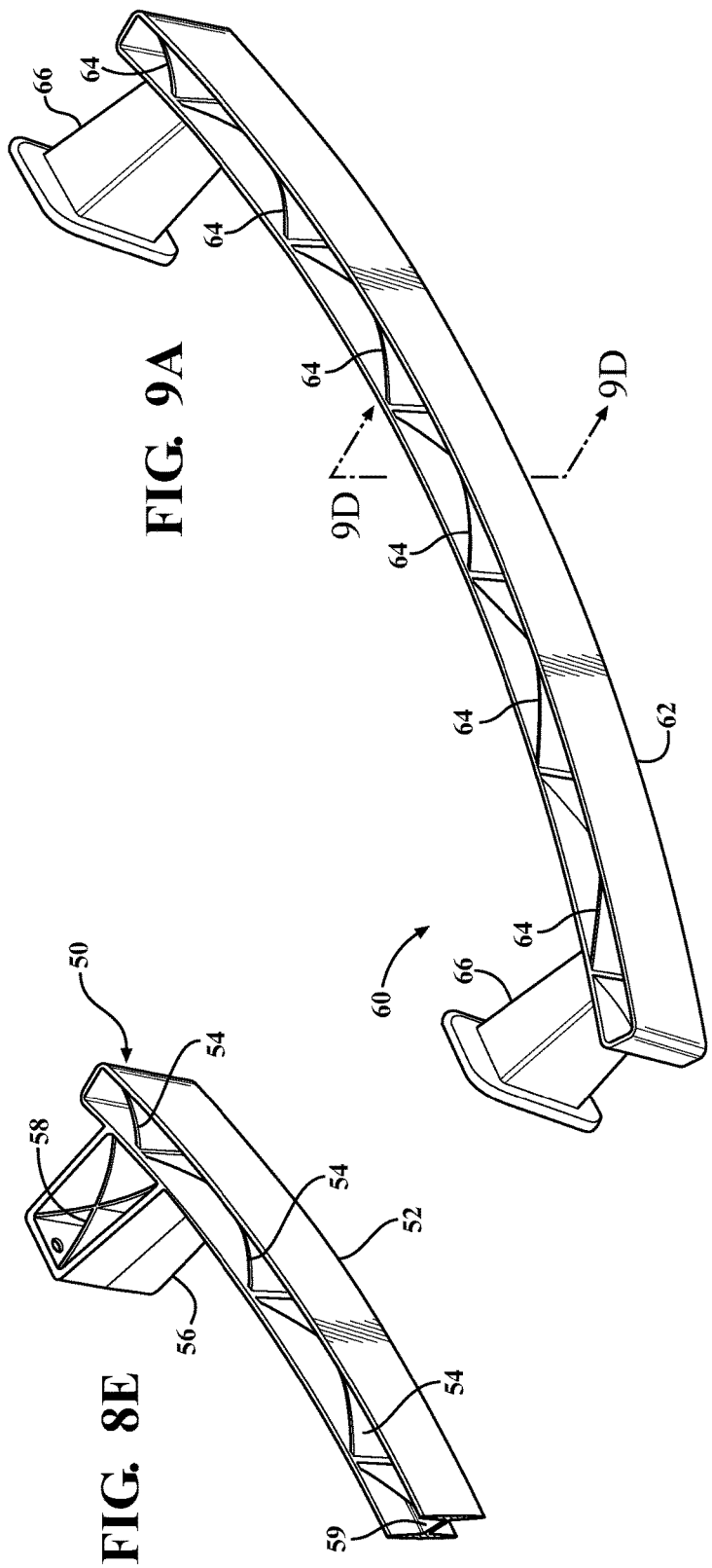
FIG. 8E
FIG. 9A
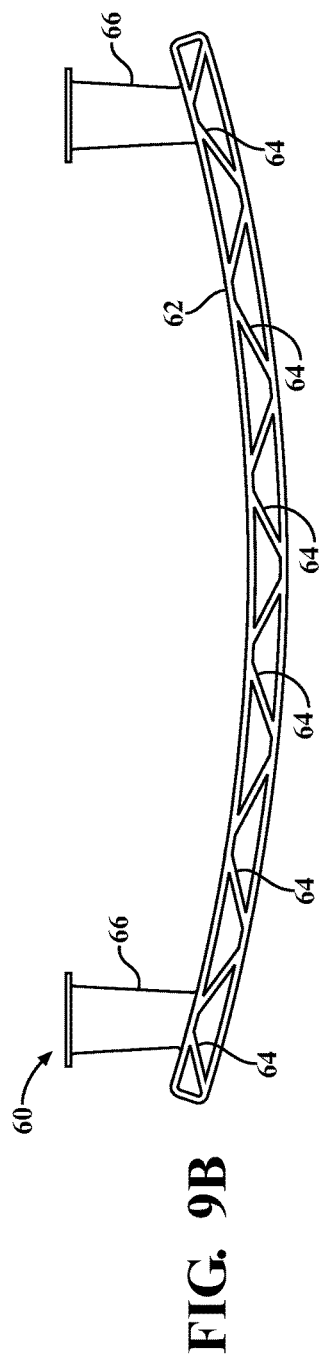
FIG. 9B

CAST BUMPER ASSEMBLY AND METHOD OF MANUFACTURING SAME

CROSS REFERENCE TO RELATED APPLICATIONS

This U.S. National Stage Patent Application claims the benefit of PCT International Patent Application Ser. No. PCT/US2015/039596 filed Jul. 8, 2015 entitled "Cast Bumper Assembly And Method Of Manufacturing Same," which claims the benefit of and priority to U.S. Provisional Patent Application Ser. No. 62/022,366 filed Jul. 9, 2014, the entire disclosures of the applications being considered part of the disclosure of this application, and hereby incorporated by reference.

BACKGROUND OF THE INVENTION

1. Field of the Invention

The subject invention is related to a vehicle bumper assembly including a bumper beam and a crash box. The subject invention is also related to a method of manufacturing the bumper assembly.

2. Description of the Prior Art

Vehicle bumper assemblies are known for providing energy absorbing characteristics. Body structures of a vehicle are provided with so-called crash boxes. Such crash boxes are disposed on the end of a frame member of a vehicle body structure so as to absorb an impact load of certain predetermined value, thereby eliminating deformation of the frame member of the vehicle body.

Bumper assemblies include a bumper beam typically extending laterally across the front or rear of a vehicle and provided generally for absorbing energy during a frontal or rear impact. Such bumper beams disposed under a cosmetic or fascia bumper and are mounted to a vehicle frame with use of the so-called crash boxes referred to above. The crash-boxes are designed to fold upon such frontal or rear impacts.

The crash boxes are mounted to the vehicle frame and the bumper beam by many different means including, without limitation, welding, adhesives, fasteners, etc. Such crash boxes and bumper beams can be made of many different types of materials including, without limitation, steel, aluminum, and/or magnesium. In addition, such crash boxes and bumper beams are manufactured by way of extrusion, steel roll forming, or hot stamping manufacturing processes.

There remains a significant and continuing need for a design of a crash box and bumper beam that allows for lower manufacturing and assembling costs along with improved energy absorption properties. There also remains a significant and continuing need for an improved method of manufacturing a vehicle bumper assembly which is cost effective, reduces manufacturing steps, and also able to produce an assembled product having improved energy absorption and other performance properties.

SUMMARY OF THE INVENTION

The subject invention includes a vehicle bumper assembly wherein at least one of the bumper beam or the crash box is a metal cast component. The subject invention also includes a method of manufacturing a vehicle bumper assembly which includes metal casting at least one of the bumper beam or the crash box.

A bumper assembly according to the subject invention is advantageous because the cast components can be designed and manufactured with a specific geometry that can be tuned to meet weight, price, and performance requirements for the bumper assembly, ail with a casting manufacturing process that reduces process steps and costs. In addition, the cast components of the subject bumper assembly are lighter than equivalent components prior art bumper assemblies manufactured by way of extrusion, steel roll forming, or hot stamping manufacturing processes, and thus leads to performance improvements.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a perspective view of a first embodiment of the bumper assembly illustrating the cast bumper beam secured to a crash box;

FIG. 4 is a perspective view of a second embodiment of the bumper assembly illustrating a cast crash box secured to a bumper beam;

FIG. 7A is a perspective view of a fourth embodiment of the bumper assembly including a W-shaped cast bumper beam integral with a cast crash box;

FIG. 7B is a top view of the fourth embodiment of the bumper assembly;

FIG. 7C is a front view of the fourth embodiment of the bumper assembly;

FIG. 7D is a cross-sectional view taken along A-A of FIG. 7A;

FIG. 8A is a perspective view of a fifth embodiment of the bumper assembly including an H-shaped cast bumper beam integral with a cast crash box and each of the cast bumper beam and cast crash box having open top and bottom surfaces;

FIG. 8B is a top view of the fifth embodiment of the bumper assembly;

FIG. 8C is a front view of the fifth embodiment of the bumper assembly;

FIG. 8D is a cross-sectional view along B-B of FIG. 8A;

FIG. 8E is a partial perspective view of the fifth embodiment of the bumper assembly;

FIG. 9A is a perspective view of a sixth embodiment of the bumper assembly including an H-shaped cast bumper beam integral with a cast crash box having closed top and bottom surfaces;

FIG. 9B is a top view of the sixth embodiment of the bumper assembly;

DETAILED DESCRIPTION OF THE ENABLING EMBODIMENTS

Figure 1:
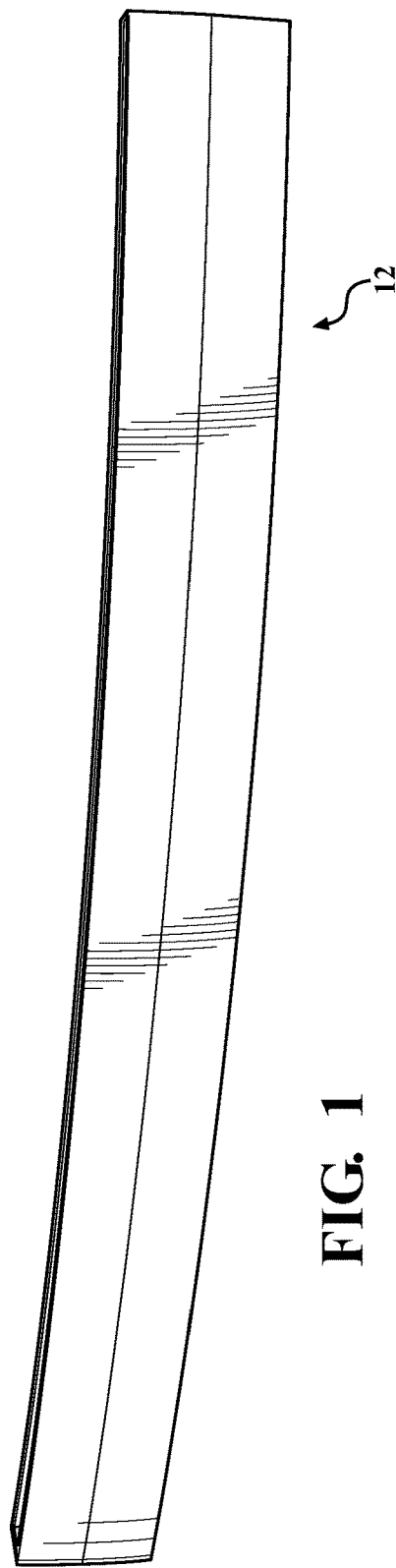
FIG. 1 is a perspective view of a cast bumper beam.

Referring to the figures, wherein like numerals indicate corresponding parts throughout the several views, FIG. 1 is a perspective view of a cast bumper beam, shows generally at 12, for use in a vehicle bumper assembly. Such vehicle bumper assemblies are known for providing energy absorbing characteristics, and the cast bumper beam 12 typically extends laterally across the front or rear of a vehicle (not shown) and is mounted to a vehicle frame with use of the crash boxes. The cast bumper beam 12 is cast from metal material, such as aluminum or magnesium, and has a specific design of geometry that can be tuned to meet the energy absorbance and weight requirements for the overall bumper assembly (not expressly shown). However, other types of metal and/or metal alloys may be selected without departing from the scope of the subject disclosure. Although not expressly shown, the cast bumper beam 12 can have variable, non-constant sections with regard to width, geometry, and/or thickness.

Figure 2:
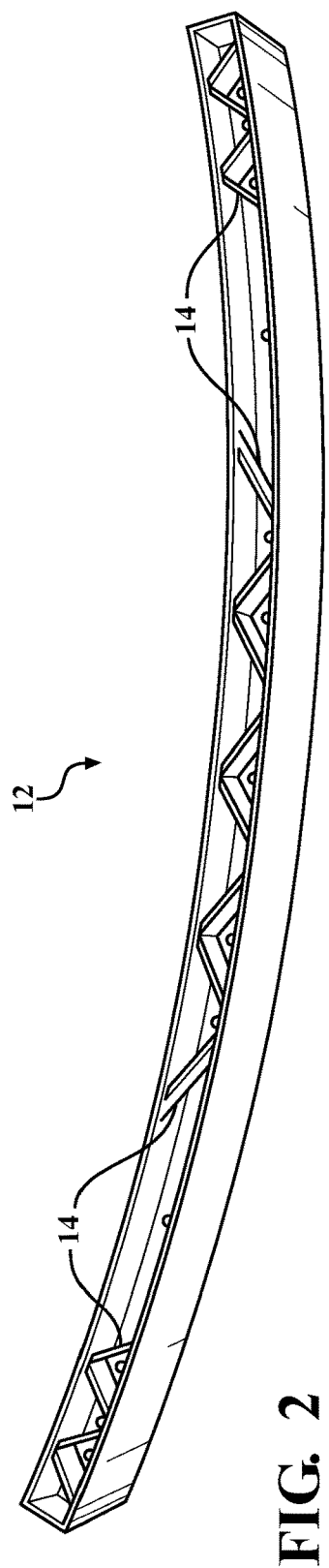
FIG. 2 is a top view of the cast bumper beam illustrating a plurality of reinforcement ribs integrally cast therewith.

As best shown in FIG. 2, the cast bumper beam 12 can include a plurality of reinforcing ribs 14 having a "V" shape that are each cast integrally with the bumper beam 12 and arranged to facilitate controlled crash properties for the overall bumper assembly (not expressly shown), it should be appreciated that the "V"-shaped reinforcing ribs 14 could also be any number of other shapes depending on the design criteria selected including, without limitation, the amount of structural support desired, weight, and/or the amount of desired crush. As best shown in FIG. 3, the cast bumper beam 12 can be mounted to or combined with a crash box 16 that is manufactured according to traditional manufacturing processes, such as extrusion, steel roll forming, hot stamping, or the like, to form a first embodiment of the bumper assembly, generally shown at 10. In a preferred arrangement, the cast bumper beam 12 is welded to the crash box 16, however many other different means, including, without limitation, adhesives, fasteners, or the like, can also be used without departing from the scope of the subject disclosure.

FIG. 4 illustrates a second embodiment of the bumper assembly, shown generally at 20, in which a cast crash box 26 is be mounted to or combined with a bumper beam 22 manufactured according to traditional manufacturing processes, such as extrusion, steel roll forming, hot stamping, or the like. The cast crash box 26 is cast from metal materials, such as aluminum or magnesium, and has a specific design of geometry that can be tuned to meet the energy absorbance and weight requirements for the overall bumper assembly 20. However, other types of metal and/or metal alloys may be selected without departing from the scope of the subject disclosure. Similar to the first embodiment, the cast crash box 26 can be welded to the bumper beam 22, however many other different means, including, without limitation, adhesives, fasteners, or the like, can also be used without departing from the scope of the subject disclosure.

Figure 5:
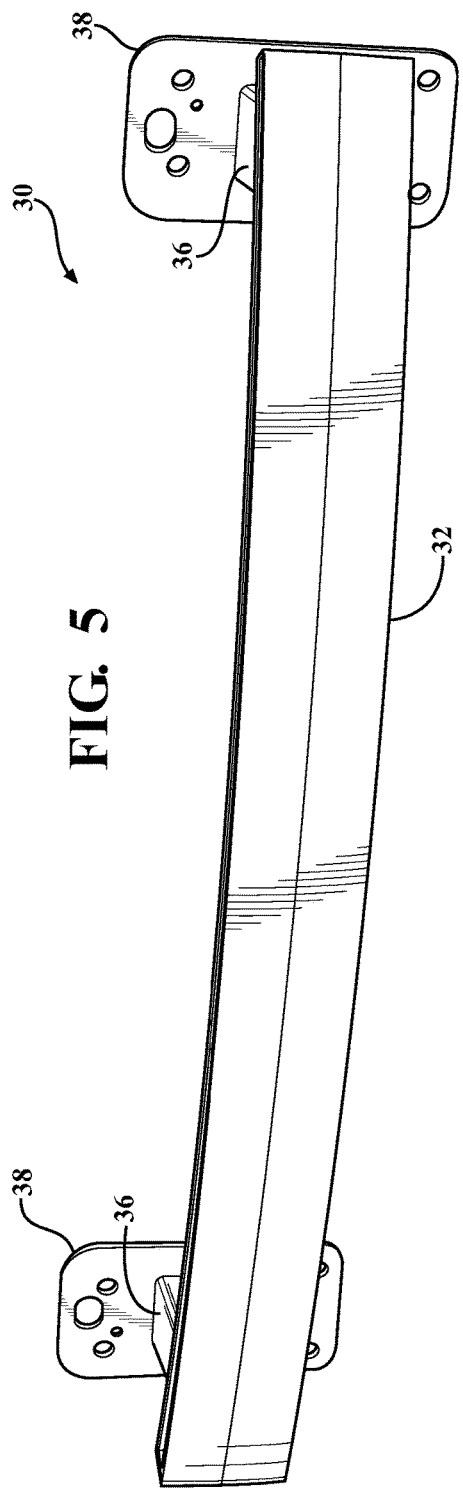
FIG. 5 is a perspective view of a third embodiment of the bumper assembly illustrating a cast bumper beam integral with a cast crash box.

FIG. 5 illustrates a third embodiment of the bumper assembly, shown generally at 30, which includes a cast bumper beam 32 integral with a cast crash box 36. Put another way, in the third embodiment of the bumper assembly 30, the cast bumper beam 32 and the cast crash box 36 are manufacturing integral with one another during the same casting process. Each of the cast bumper beam 32 and the cast crash box 36 are cast from metal materials, such as aluminum or magnesium, however, other types of metal and/or metal alloys may be selected without departing from the scope of the subject disclosure. Each of the cast bumper beam 32 and cast crash box 36 have a specific design of geometry that can be tuned to meet the energy absorbance and weight requirements for the overall bumper assembly 30, with one or both of these components having variable, non-constant sections with regard to width, geometry, and/or thickness.

Unlike the first and second embodiments of the bumper assembly 10, 20, the third embodiment of the bumper assembly advantageously does not require a weld, adhesive, or other fastener to effectuate securement of the cast crash box 36 to the cast bumper beam 32. Accordingly, the third embodiment of the bumper assembly 30 reduces manufacturing steps and costs, and results in a bumper assembly that is stronger, cheaper, and lighter over prior art designs. In an exemplary embodiment, the bumper assembly 30 can be approximately 0.5 kg lighter than prior art bumper assembly designs.

Figure 6:
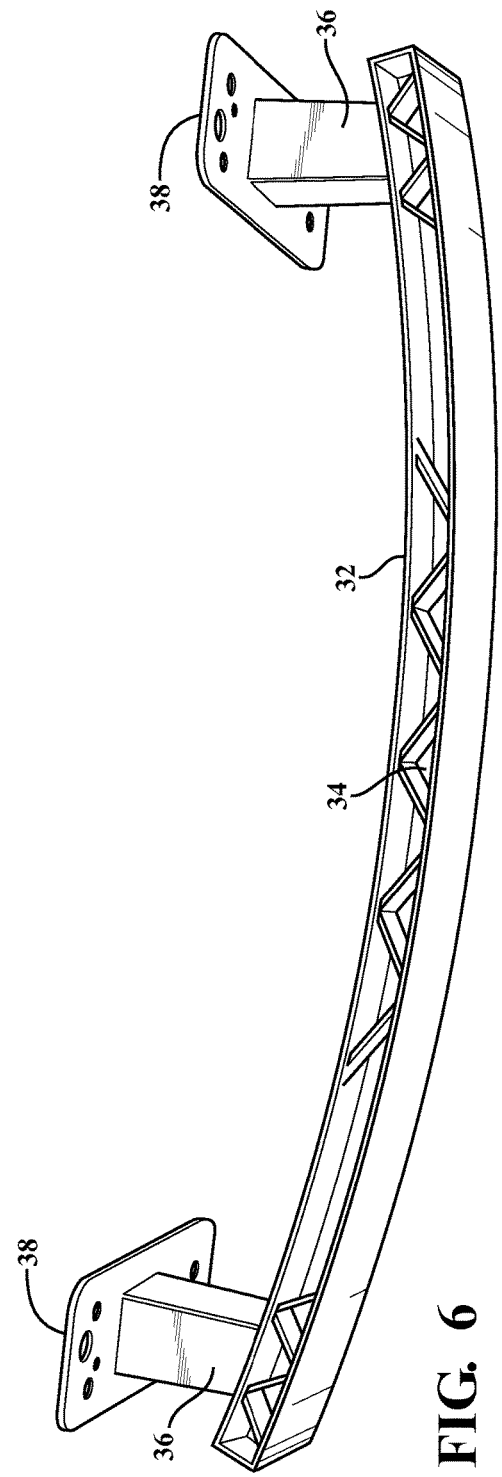
FIG. 6 is a top view of the third embodiment of the bumper assembly illustrating a plurality of reinforcement ribs integrally cast with the cast bumper beam.

As best shown in FIG. 5, the cast crash box 36 can also include a mounting plate 38 cast integral therewith for use in mounting the bumper assembly 30 to a vehicle frame (not expressly shown). As best shown in FIG. 6, the cast bumper beam 32 can also include a plurality of reinforcing ribs 34 having a "V" shape that are each cast integrally with the cast bumper beam 32 and arranged to facilitate controlled crash properties for the overall bumper assembly (not expressly shown). It should be appreciated that the "V"V-shaped reinforcing ribs 34 could also be any number of other shapes depending on the design criteria selected including, without limitation, the amount of structural support desired, weight, and/or the amount of desired crush.

FIGS. 7A-7D illustrate a fourth embodiment of the bumper assembly, shown generally at 40, which includes a cast bumper beam 42 integral with a cast crash box 46. Similar to the third embodiment, the cast bumper beam 42 and the cast crash box 46 of the fourth embodiment of the bumper assembly 40 are also manufactured integral with one another during the same casting process. Each of the cast bumper beam 42 and the cast crash box 46 are cast from metal materials, such as aluminum or magnesium, however, other types of metal and/or metal alloys may be selected without departing from the scope of the subject disclosure. Each of the cast bumper beam 42 and cast crash box 46 have a specific design of geometry that can be tuned to meet the energy absorbance and weight requirements for the overall bumper assembly 40, with one or both of these components having variable, non-constant sections with regard to width, geometry, and/or thickness. The fourth embodiment of the bumper assembly also advantageously does not require a weld, adhesive, or other fastener to effectuate securement of the cast crash box 46 to the cast bumper beam 42. Accordingly, the fourth embodiment of the bumper assembly 30 reduces manufacturing steps and costs, and results in a bumper assembly that is stronger, cheaper, and lighter over prior art designs.

As best shown in FIG. 7A, each of the cast crash boxes 46 define an internal cavity 47 and the cast bumper beam 42 defines a plurality of front openings 44 each disposed adjacent to and in communication with a respective internal cavity 47 of the cast crash boxes 46. The incorporation of the front openings 44 into the cast bumper beam 42 improves the manufacturability of the cast bumper assembly 40. As best shown in FIG. 7D, the cast bumper beam can also be cast to have a "W" shape extending along at least a portion of its length to facilitate controlled crash properties for the bumper assembly 40.

FIGS. 8A-8E illustrate a fifth embodiment of the bumper assembly, shown generally at 50, which includes a cast bumper beam 52 integral with a cast crash box 56. Put another way, similar to the third and fourth embodiments, the cast bumper beam 52 and the cast crash box 56 of the fifth embodiment of the bumper assembly 50 are also manufactured integral with one another during the same casting process. Each of the cast bumper beam 52 and the cast crash box 56 are cast from metal materials, such as aluminum or magnesium, however, other types of metal and/or metal alloys may be selected without departing from the scope of the subject disclosure. Each of the cast bumper beam 52 and the cast crash box 56 have a specific design of geometry that can be tuned to meet the energy absorbance and weight requirements for the overall bumper assembly 50, with one or both of these components having variable, non-constant sections with regard to width, geometry, and/or thickness. The fifth embodiment of the bumper assembly 50 also advantageously does not require a weld, adhesive, or other fastener to effectuate securement of the cast crash box 56 to the cast bumper beam 52. Accordingly, the fifth embodiment of the bumper assembly 50 reduces manufacturing steps and costs, and results in a bumper assembly that is stronger, cheaper, and lighter over prior art designs.

As best shown in FIGS. 8A and 8D-8E, each of the cast bumper beam 52 and cast crash boxes 56 are open along a top and bottom portion to improve the manufacturability of the cast bumper assembly 50. As best shown in FIGS. 8A-8B and 8E, the cast bumper beam 52 can include a plurality of reinforcing ribs 54 having a "V" shape that are each cast integrally with the bumper beam 52 and the cast crash boxes 56 can include a plurality of reinforcing ribs 58 having an "X" shape that are each cast integrally with the crash box 56. The reinforcing ribs 54, 58 are arranged to facilitate controlled crash properties for the bumper assembly 50. It should be appreciated that the "V"-shaped and "X"-shaped reinforcing ribs 54, 58 could also be any number of other shapes depending on the design criteria selected including, without limitation, the amount of structural support desired, weight, and/or the amount of desired crush. As best shown, in FIGS. 8D and 8E, the cast bumper beam 52 can also be cast to have an "H" shape and define an additional horizontal or transverse rib 59 extending along at least a portion of the length to further control the crash properties of the bumper assembly 50.

FIGS. 9A-9E illustrate a sixth embodiment of the bumper assembly, shown generally at 60, which includes a cast bumper beam 62 integral with a cast crash box 66. Similar to the third, fourth, and fifth embodiments, the cast bumper beam 62 and the cast crash box 66 of the sixth embodiment of the bumper assembly 60 are manufactured integral with one another during the same casting process. Each of the cast bumper beam 62 and the cast crash box 66 are cast from metal materials, such as aluminum or magnesium, however, other types of metal and/or metal alloys may be selected without departing from the scope of the subject disclosure. Each of the cast bumper beam 62 and cast crash box 66 have a specific design geometry that can be tuned to meet the energy absorbance and weight requirements for the overall bumper assembly 60, with one or both of these components having variable, non-constant sections with regard to width, geometry, and/or thickness. The sixth embodiment of the bumper assembly 60 also advantageously does not require a weld, adhesive, or other fastener to effectuate securement or mounting of the cast crash box 66 to the cast bumper beam 62. Accordingly, the sixth embodiment of the bumper assembly 60 reduces manufacturing steps and costs, and results in a bumper assembly that is stronger, cheaper, and lighter over prior art designs.

Figure 9C:
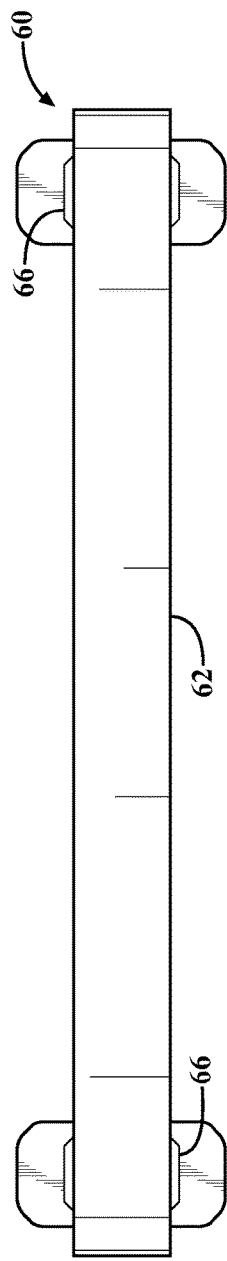
FIG. 9C is a from view of the sixth embodiment of the bumper assembly.
Figure 9E:
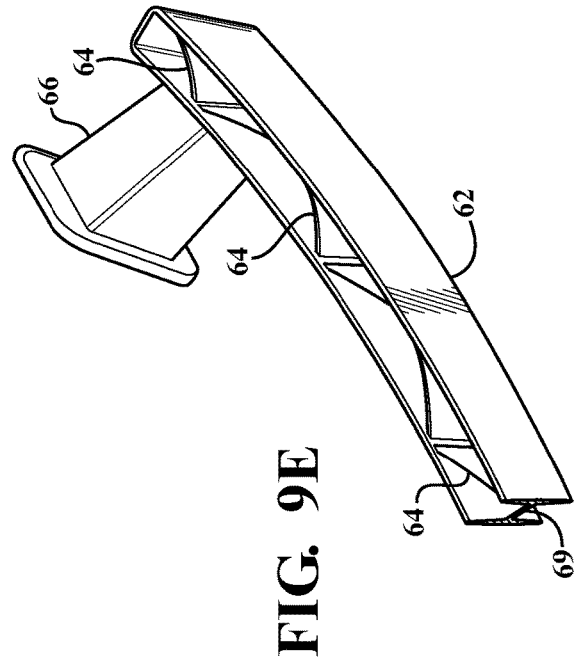
FIG. 9E is a partial perspective view of the sixth embodiment of the bumper assembly.
Figure 9D:
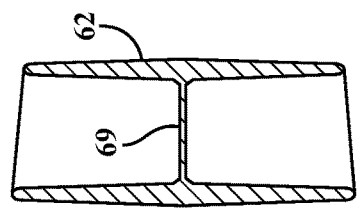
FIG. 9D is a cross-sectional view along C-C of FIG. 8A.

As best shown in FIGS. 9A-9B and 9E, the cast bumper beam 62 is open along a top and bottom portion of the bumper assembly 60, while the cast crash box 66 is closed along these same portions. As best shown in FIGS. 9A-9B and 9E, the cast bumper beam 62 can include a plurality of reinforcing ribs 64 having a "V" shape that are each cast integrally with the cast bumper beam 62. However, it should be appreciated that the "V"-shaped reinforcing ribs 64 could also be any number of other shapes depending on the design criteria selected including, without limitation, the amount of structural support desired, weight, and/or the amount of desired crush. As best shown in FIGS. 9D and 9E, similar to the fifth embodiment, the cast bumper beam 62 can also be cast to have an "H" shape and define an additional horizontal or transverse rib 69 extending along at least a portion of the length to further control the crash properties of the bumper assembly 60.

Figure 10A:
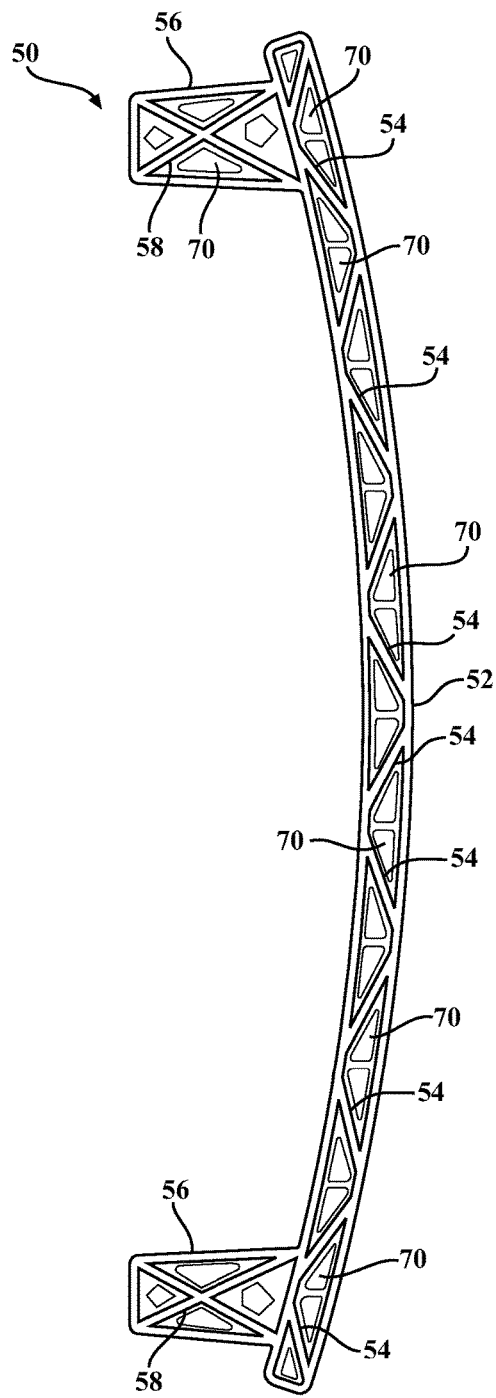
FIG. 10A is a top view of the bumper assembly shown FIG. 8A illustrating a plurality of weight reduction holes deigned by the H-shaped cast bumper beam and the cast crash box.
Figure 10B:
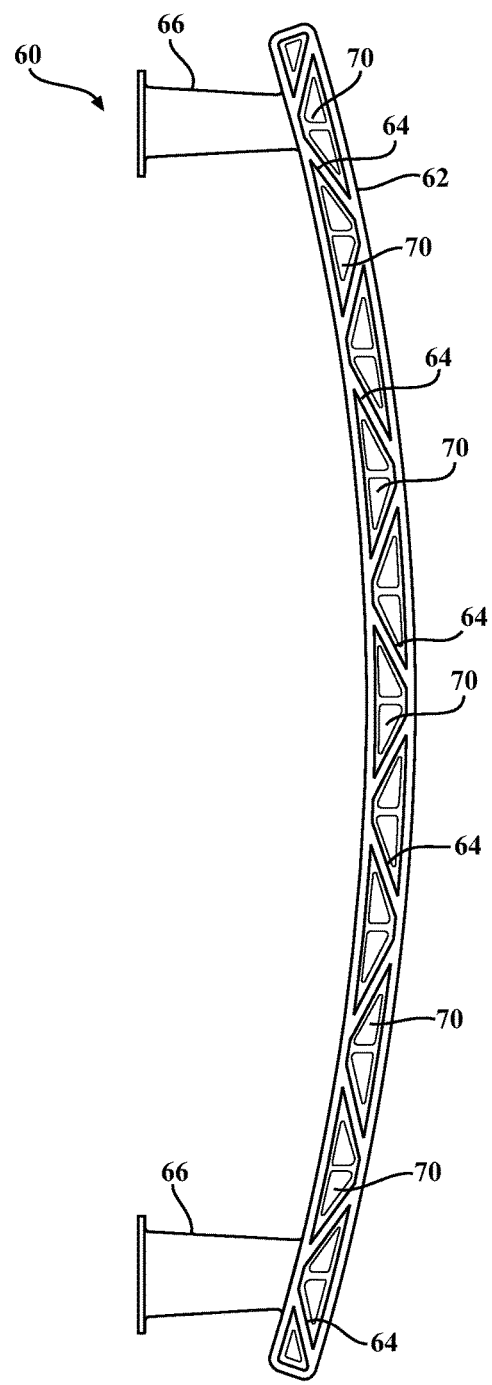
FIG. 10B is a top view of the Bumper assembly shown in FIG. 9A illustrating a plurality of weight reduction holes defined by the H-shaped cast bumper beam.

FIGS. 10A and 10B illustrate an alternative arrangement of the fifth and sixth embodiments of the bumper assembly 50, 60, respectively, in which the horizontal or transverse rib 59, 69 of the bumper beam 52, 62 defines a plurality of weight reduction holes 70 to further reduce the overall weight of the cast bumper assembly 50, 60. As shown in FIG. 10A, in the alternative arrangement of the fifth embodiment of the bumper assembly, the cast crash box 56 can also define a plurality of weight reduction holes to even further reduce the overall weight of the cast bumper assembly 50.

Although not expressly shown in the figures, one or both of the bumper beam or the crash box in any of the aforementioned embodiments of the bumper assembly can also be cast to incorporate various design features including but not limited to: head lamps, ambient air sensors, pedestrian brackets, collision avoidance sensors, a hood latch, pedestrian protection systems, horns, grilles, fog lamps, toe hooks, threaded inserts, and neoprene shock absorption materials. As such, the cast bumper assembly can incorporate design features and shapes that would otherwise have to be welded onto prior art bumper assemblies, or stretch bent into prior art bumper assemblies. Thus, the cast bumper assembly avoids the machining and welding operations that are required to incorporate these features into prior art bumper assemblies manufactured by way of extrusion, steel roll forming, hot stamping, or the like.

Although not expressly shown in the figures, the cast bumper beam in any of the aforementioned embodiments of the bumper assembly can also be cast to have a "U"-shape or "C"-shape extending along a portion of its length.

Although not expressly shown in the figures, one or both of the bumper beam or the crash box in any of the aforementioned embodiments of the bumper assembly can also include absorption inserts placed anywhere within or along the bumper assembly.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A bumper assembly:
a bumper beam;
at least one crash box interconnected to said bumper beam;
wherein both of said bumper beam and said at least one crash box are cast from metal to establish an integral connection therebetween;
said cast bumper beam and said at least one cast crash box being open along a top and bottom portion of the bumper assembly;
each of said cast bumper beam and said at least one cast crash box including at least one reinforcing rib cast integral therewith; and
wherein said cast bumper beam is H-shaped along at least as portion of its length to define a horizontal or transverse rib.

2. A bumper assembly as set forth in claim 1, wherein said horizontal or transverse rib defines a plurality of weight reduction holes.

3. A bumper assembly as set forth in claim 1, wherein said at least one reinforcing rib integrally cast with said cast bumper beam includes a plurality of V-shaped reinforcing ribs.

4. A bumper assembly as set forth in claim 1, wherein said at least one reinforcing rib integrally cast with said at least one cast crash box includes an X-shaped reinforcing rib.

5. A bumper assembly comprising:
a bumper beam;
at least one crash box interconnected to said bumper beam;
wherein both of said bumper beam and said at least one crash box are cast from metal to establish an integral connection therebetween;
said cast bumper beam being open along a top and bottom portion of the bumper assembly and said at least one cast crash box being closed along the top and bottom portion of the bumper assembly;
said cast bumper beam including at least one reinforcing rib cast integral therewith; and
wherein said cast bumper beam is H-shaped along at least a portion of its length to define a horizontal or transverse rib.

6. A bumper assembly as set forth in claim 5, wherein said horizontal or transverse rib defines a plurality of weight reduction holes.

7. A bumper assembly as set forth in claim 5, wherein said at least one reinforcing rib integrally cast with said cast bumper beam includes a plurality of V-shaped reinforcing ribs.

* * * * *